United States Patent

Corcoran et al.

[11] Patent Number: 5,257,680
[45] Date of Patent: Nov. 2, 1993

[54] SURFACE EFFECT DAMPERS HAVING BOTH HYSTERESIS AND A FRICTIONAL COMPONENT

[75] Inventors: Patrick E. Corcoran, Rockford, Mich.; Richard P. Thorn, Erie, Pa.

[73] Assignee: Lord Corporation, Erie, Pa.

[21] Appl. No.: 812,192

[22] Filed: Dec. 20, 1991

[51] Int. Cl.$^5$ .................. B60T 7/12; F16F 9/30
[52] U.S. Cl. .................. 188/129; 188/268; 188/271; 188/281; 188/290; 188/380; 188/381; 267/134; 267/140.13; 267/219
[58] Field of Search .............. 267/134, 196, 201, 214, 267/219, 293, 294, 140.4, 141, 140.11, 140.13, 140.1 R, 140.1 A; 188/129, 268, 281, 284, 290, 322.11, 322.19, 372, 378–381

[56] References Cited

U.S. PATENT DOCUMENTS

| | | |
|---|---|---|
| 1,260,019 | 3/1918 | Oliver ............ 188/129 X |
| 2,199,145 | 4/1940 | Watson ............ 188/129 |
| 2,570,370 | 10/1951 | O'Connor ............ 267/201 |
| 3,053,526 | 9/1962 | Kendall ............ 267/134 |
| 3,107,905 | 10/1963 | Lucas ............ 267/140.4 X |
| 3,113,640 | 12/1963 | Stedman ............ 188/378 |
| 3,160,233 | 12/1964 | Norman et al. ............ 188/268 |
| 3,232,597 | 2/1966 | Gaydecki ............ 267/219 |
| 3,365,189 | 1/1968 | Carlson ............ 267/152 |
| 3,583,530 | 6/1971 | DeVenne ............ 188/268 |
| 3,696,891 | 10/1972 | Poe ............ 188/268 |
| 3,795,391 | 3/1994 | Poe ............ 267/136 |
| 3,796,288 | 3/1974 | Hollnagel ............ 188/129 |
| 3,817,506 | 6/1974 | Jarret et al. ............ 267/141.4 |
| 3,820,634 | 6/1974 | Poe ............ 188/268 |
| 3,948,497 | 4/1976 | Lovitt et al. ............ 267/201 |
| 3,975,007 | 8/1976 | Chorkey ............ 267/152 |
| 4,011,929 | 3/1977 | Jeram et al. ............ 188/268 |
| 4,238,104 | 12/1980 | Hamilton ............ 188/380 X |
| 4,503,951 | 3/1985 | Imaizumi ............ 188/280 |
| 4,583,621 | 4/1986 | Tangorra ............ 188/67 |
| 4,591,030 | 5/1986 | Antkowiak ............ 188/268 |
| 4,955,467 | 9/1990 | Kallenbach ............ 188/381 |
| 4,957,279 | 9/1990 | Thorn ............ 267/140.5 |
| 4,974,794 | 12/1990 | Aubry et al. ............ 267/140.1 R X |
| 5,183,137 | 2/1993 | Siwek et al. ............ 188/381 |

FOREIGN PATENT DOCUMENTS

| | | | |
|---|---|---|---|
| 0598485 | 6/1934 | Fed. Rep. of Germany ...... 188/129 |
| 2019134 | 11/1971 | Fed. Rep. of Germany ...... 188/129 |
| 0140138 | 6/1988 | Japan ............ 188/381 |
| 1477960 | 5/1989 | U.S.S.R. ............ 188/381 |

Primary Examiner—Robert J. Oberleitner
Assistant Examiner—Josie A. Ballato
Attorney, Agent, or Firm—Richard K. Thomson; Randall S. Wayland

[57] ABSTRACT

Several improved embodiments of surface effect dampers that produce a damping force including both hysteretic and frictional components. Various improvements include an amplitude sensitive feature or decoupler mechanism to eliminate or greatly reduce the damping for low amplitude input conditions as compared to high amplitude inputs, provisions for increasing the damping force in a non-linear manner, and features for providing significantly greater damping in one direction than the other. Other embodiments include an improved rotational surface effect damper useful for damping rotational motion, and a multiaxial damper which can be used, for example, as a motor mount which has the capability for the piston to tilt relative to the axis of its piston rod, allowing accommodation of torsional rotation of the engine while not compromising vibration isolation.

28 Claims, 13 Drawing Sheets

SURFACE EFFECT DAMPERS HAVING BOTH HYSTERESIS AND A FRICTIONAL COMPONENT

BACKGROUND AND SUMMARY OF THE INVENTION

The present invention is directed to improvements in dampers. More particularly, the present invention is directed to surface effect dampers that produce a damping force which includes both hysteretic and frictional components.

This development is related to the invention described and claimed in U.S. patent application Ser. No. 07/811,758, entitled "Dual-Rate Surface Effect Dampers" filed Dec. 20, 1991 and now U.S. Pat. No. 5,183,137. That application is hereby incorporated by reference.

The principle of operating a hysteresis damper is that translational or rotational energy is dissipated by working an elastomeric element (e.g., a rubber element) to convert that kinetic energy into heat energy. In the past, in order to function properly as a hysteresis damper, the amount of energy dissipated through hysteresis had to be significantly greater than the energy dissipated through friction, or the durability of the elastomeric element would be inadequate to warrant usage. By minimizing friction damping, the damping capabilities of the device were significantly limited.

The key patent in the development of hysteresis dampers is U.S. Pat. No. 3,232,597, issued to Haydecki. Many different conceptual aspects of hysteresis dampers are dealt with in the Gaydecki patent, which discloses a large number of embodiments in its specification and includes twenty-six figures. Still, in the over twenty-five years since Gaydecki initiated development of the concept of hysteresis dampers, very little has been done with them. This dirth of activity is in spite of the tremendous potential of such devices have to overcome the problems associated with hydraulic dampers and gas springs. Hydraulic dampers and gas springs have elements that are required to function as both seals and bearings. As the bearing element wears, it will necessarily lose the close tolerance it originally had with the slidable member, resulting in its inability to seal properly and, eventually, loss of hydraulic or pneumatic pressure. Once wear has progressed to that point, the useful life of such a damper is ended and costly replacement is necessary.

It is the purpose of this invention to devise various improvements in dampers which utilize hysteresis damping to enable them to realize their full potential. The surface effect damper of the present invention combines friction damping with hysteresis damping to increase the available damping force without adversely effecting wear life of the damper. Further, the features of the present invention make the surface effect damper better suited for a variety of applications.

One such improvement includes a feature by which the damper is made amplitude sensitive, that is, it has a decoupler mechanism to eliminate or greatly reduce the damping for low amplitude input conditions (normal operating conditions), as compared to the damping available for high amplitude inputs, (resonances or shock loading). This type surface effect damper could be used in place of a conventional shock absorber.

Another feature of the present invention is the provision of means to increase the damping force in a non-linear manner in response to increased amplitude due to shock loading. This feature provides a steadily increasing braking force for dissipation of energy. Such a non-linear feature is useful in applications such as shock absorbers and the like.

Another embodiment is designed to provide significantly greater damping in one direction than in the other. Such a surface effect damper could readily be used in place of a conventional gas spring.

Still another embodiment provides an improved rotational surface effect damper useful for damping rotational motion. Such a device could be adapted for use as a rotational brake or used as a rotational resonance damper for any number of different applications (vehicles, machinery, etc.).

Yet another embodiment of the present invention sets forth a multiaxial damper which can be used, for example, as a motor mount. This embodiment has the capability for the piston to tilt or misalign relative to the axis of its piston rod. In this manner, certain torsional vibrations of the engine can be both accommodated and damped. This embodiment constitutes an improved configuration, for some applications, over the mount set forth in Applicant's earlier U.S. Pat. No. 4,957,279, which is herein incorporated by reference.

Various other characteristics, features and advantages of the dampers of the present invention will become apparent after viewing the attached drawings and reading the following detailed description.

DETAILED DESCRIPTION OF THE PREFERRED EMBODIMENTS

Figure 1:
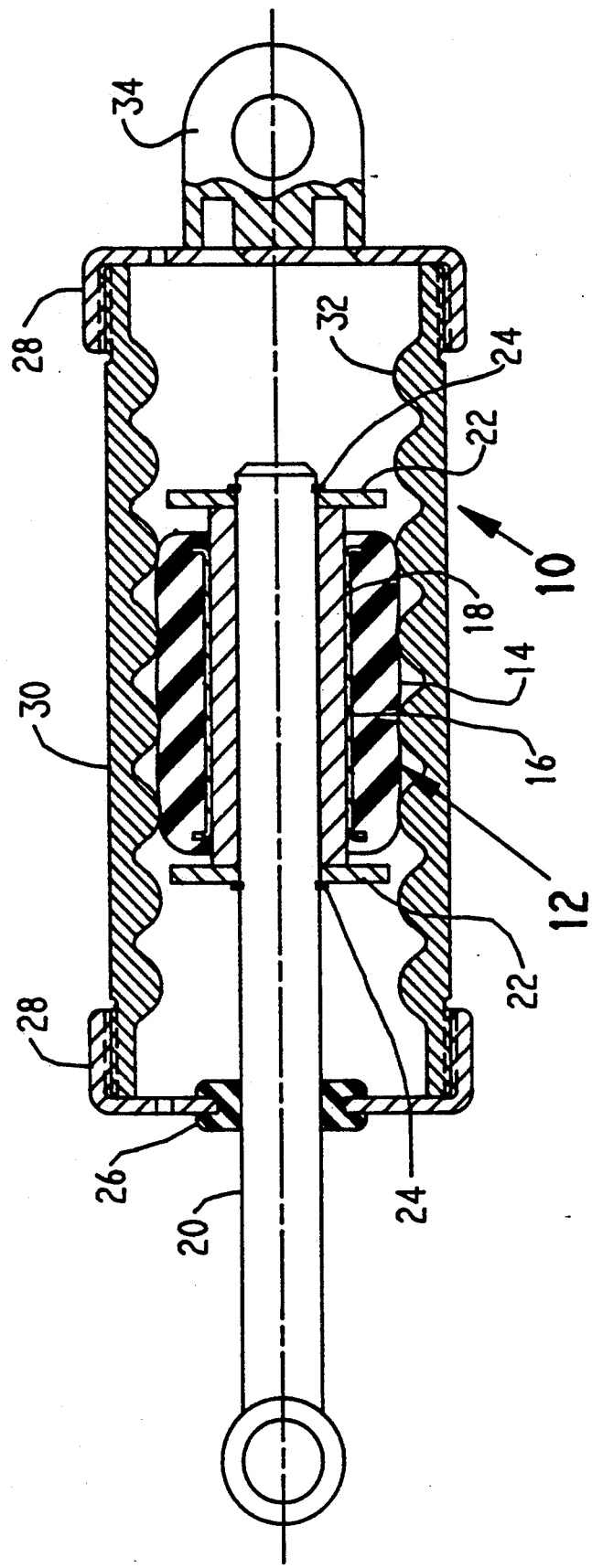
FIG. 1 is a side elevational view in partial section depicting a first embodiment of the present invention.

A first embodiment of the surface effect damper is shown in FIG. 1 generally at 10. A piston 12 is mounted upon a piston rod 20 for movement within and relative to a housing 30. Piston 12 comprises a molded elastomeric sleeve 14 made of preferably highly damped rubber which exhibits good durability. For convenience, the elastomeric member in each damper will be referred to as the "rubbing" element and the metallic member as the "rubbee" element. A first inner bushing 16 may be of molded plastic or a machined metal, and may be bonded to elastomer sleeve 14, depending on the application.

Sleeve 14 mounted upon bushing 16 forms a subassembly that is fit over a second inner bushing 18 which extends beyond the ends of the subassembly by a predetermined amount. The length of this extension determines the stroke length for which piston 12 is decoupled from piston rod 20. By way of example and not limitation, this distance may be on the order of 0.06 inches beyond each end. Second inner bushing 18 is fixedly attached to piston rod 20 by means of flat retaining washers 22 and retaining rings or circlips 24. While second inner bushing 18 is secured for movement with piston rod 20, first inner bushing 16 can move with comparative freedom relative to second inner bushing 18. Piston rod 20 slides through guide bearing 26 which is fitted in one of end caps 28 which are, in turn, threaded onto either end of housing 30. Guide bearing 26 is preferably made of a low friction material such as Teflon ® polymer, or the like.

The inner surface of housing 30 has a series of protrusions 32 formed thereon. The housing is preferably metallic (steel, aluminum, etc.), but could be an engineered thermoplastic or the like, and protrusions 32 may be cast, machined or molded into the inner periphery. The protrusions 32 may be formed as a continuous spiral or a series of annular ribs. The latter is preferred to minimize the tendency of the piston 12 to rotate relative to the housing 30. The inside diameter of protrusions 32 will be less than the outside diameter of elastomeric sleeve 14. The amount of interference will be selected to produce the desired minimum or threshold level of surface effect damping. This amount of interference will always be selected to require a greater force to produce relative movement between sleeve 14 and housing 30 than the force required to produce relative movement between first inner bushing 16 and second inner bushing 18.

The flanged ends of first inner bushing 16 are depicted as being internalized within sleeve 14, preferable when used with a metallic bushing 16. If bushing 16 is made of plastic, the flanged ends would sandwich sleeve 14 in the same manner shown in FIG. 6, for ease in manufacturing. The plastic bushing will inherently have a certain amount of resiliency while the cushioned end will introduce resiliency into the embodiment employing a metal bushing 16.

The ratio of hysteresis to friction damping produced by a damper 10 can be controlled by the selection of materials for housing 30 (including surface finish) and sleeve 14 as well as through the introduction of a lubricant. It is desirable to keep the ratio of hysteresis damping to friction damping in the range between 0.25 and 4.0. Design characteristics considered in selecting the ratio include amount of surface effect damping desired, abrasion resistance of the sleeve 14, heat resistance of the elastomer, and effectiveness of the damper assembly in dissipating heat.

In operation, the end of piston rod 20 is attached to one element (not shown) while eyelet 34 is attached to a second relatively movable element (not shown). For low amplitude movement between the two elements, the rod 20 is decoupled from piston 12 and no force or a minimal frictional damping force is transmitted from the vibrating element (an engine or wheel, for example) to the stationary element (e.g., frame). When the amplitude increases, washers 22 will come into alternate contact with ends of piston 12 inducing relative motion between piston 12 and housing 30. This motion will produce hysteresis damping as protrusions 32 work the rubber of the sleeve 16, and friction damping which, together, constitute the surface effect damping. As the elastomer sleeve 16 is pushed on one end and movement is resisted along the circumferential periphery by protrusions 32 the surface effect damping force is created. The non-linear damping force increase is initiated when the end of the piston 12 and the washer 22 contact.

Figure 2:
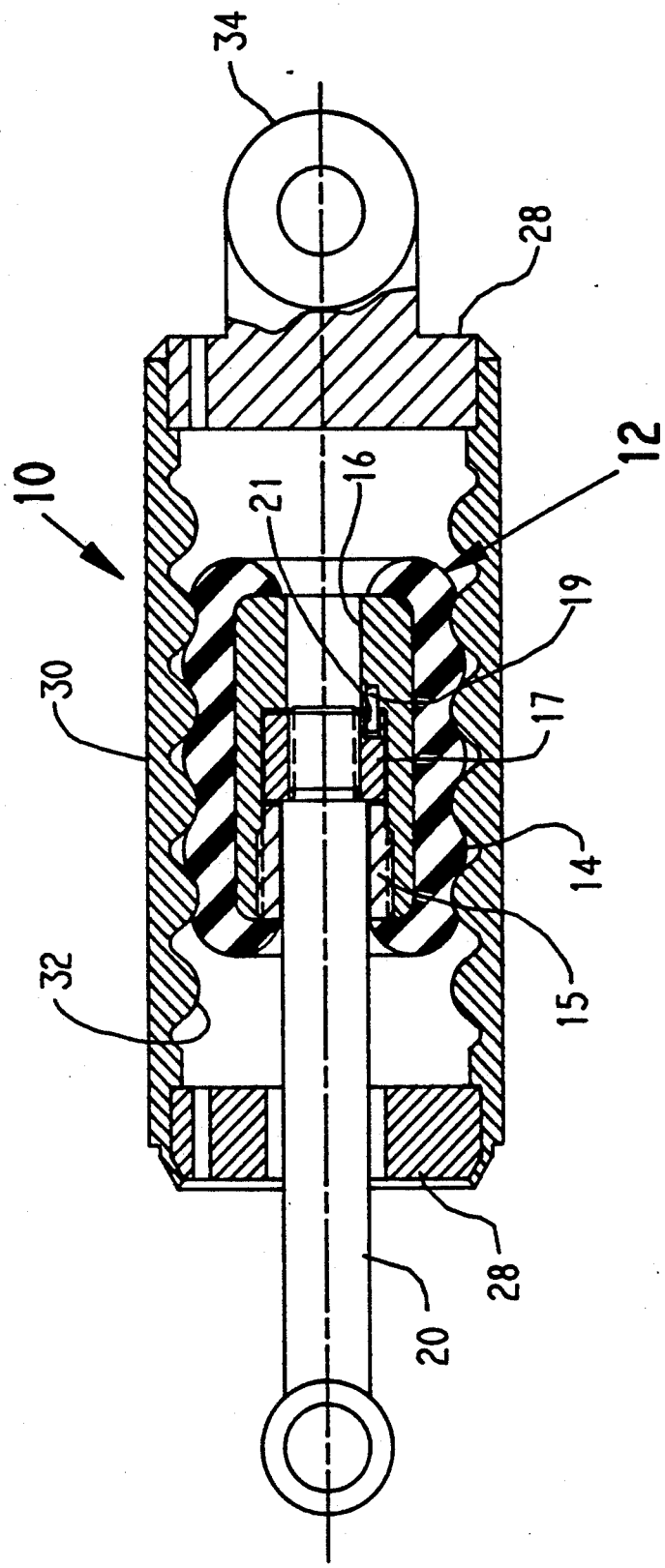
FIG. 2 is a side elevational view in partial section of a second embodiment of the present invention.

A second embodiment of the present invention damper 10 is depicted in FIG. 2. In this embodiment, elastomeric sleeve 14 of piston 12 is again made of preferably highly damped elastomer. First inner bushing 16 extends along the internal length of sleeve 14 but has a varying internal diameter which varies in stepwise fashion, shown with the end nearest piston rod 20 having the greater ID. Inner bushing 16 may be metallic, such as aluminum or steel, for example. The largest inner diameter accommodates a shoulder nut 15 which is adjustably threaded within inner bushing 16, the inner diameter of the bushing 16 slides relative to the shaft of piston rod 20. Also positioned within the cavity in inner bushing 16 is decoupling element 17, which is internal in this embodiment. The decoupling element 17 is fixed to the end of piston rod 20 as by threading, or the like. A pin 19 press fit into an opening in inner bushing 16 is slidably received in an opening 21 in decoupling element 17. Pin 19 prevents relative rotation between piston rod 20 and piston 12. The position of shoulder nut 15 within inner bushing 16 adjusts the size of the gap on either side of decoupling element 17 and, therefore, controls the length of the decoupled stroke. The piston rod 20 travels through this length before surface effect damping occurs. In this embodiment, end caps 28 are press fit into housing 30 and retained as by welding (right hand end) or crimping (left hand end). This embodiment behaves in all other particulars like the FIG. 1 embodiment in that the non-linear force occurs when the decoupling element 17 contacts or leaves contact with the bushing 16 or nut 15 at the end of the decoupled length, depending on the direction in which movement is occurring.

Figure 3:
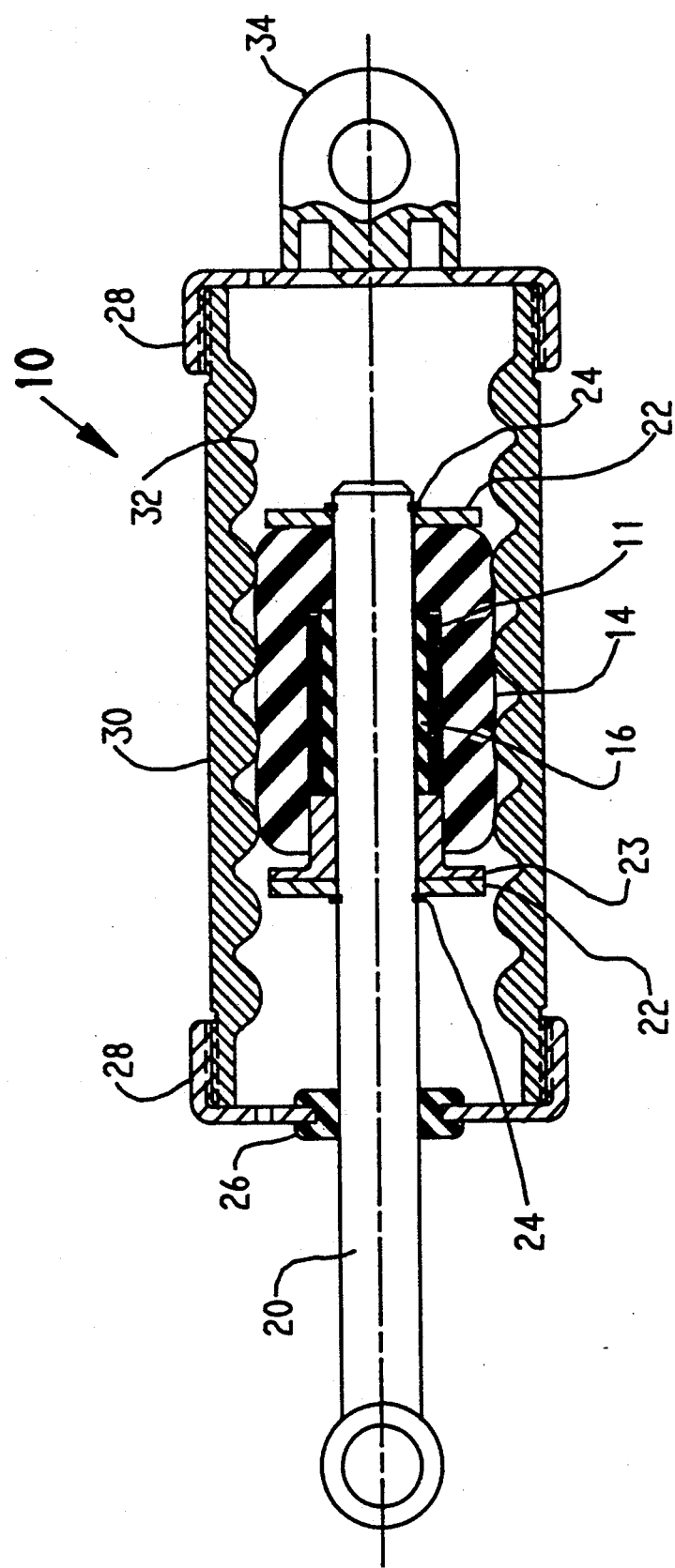
FIG. 3 is a side elevational view in partial section of a third embodiment of the present invention.

A third embodiment is depicted in FIG. 3. The damper 10 in this embodiment functions as a unidirectional damper. Elastomeric sleeve 14 has an enlarged internal cavity over a portion of this length that slidingly receives an inner elastomer bushing 16 and a layer of fluidic beads 11. It will be apparent that this embodiment could function very well for certain applications without the fluidic beads 11, by simply using an elastomeric bushing 16 to fill the cavity. Fluidic beads 11 can be glass beads, plastic beads or a powdered elastomer. Further, the beads 11 may have a uniform diameter or have varying gradation, depending on the performance characteristics desired. A compression bushing 23 engages the end of bushing 16 and fluidic beads 11. The relative difference between the distance in between the inside edges of the washers 22 as determined by the position of the circlips 24, and the length of the piston 12 and bushing 23 combined, determine the length of the decoupled stroke of piston rod 20 (if any decoupling is present).

In operation, the FIG. 3 embodiment will generate minimal or no damping when the piston is moving to the left, as depicted in the figure (the damping amount determined by the initial interference between protrusions 32 and sleeve 14), while during movement to the right, compression bushing 23 will steadily increase the compressive forces on beads 11 and bushing 16, resulting in a bulging of sleeve 14 and a non-linear increase in the surface effect damping force that is generated. Such a uni-directional damper is a suitable replacement for a gas spring for some applications.

Figure 4:
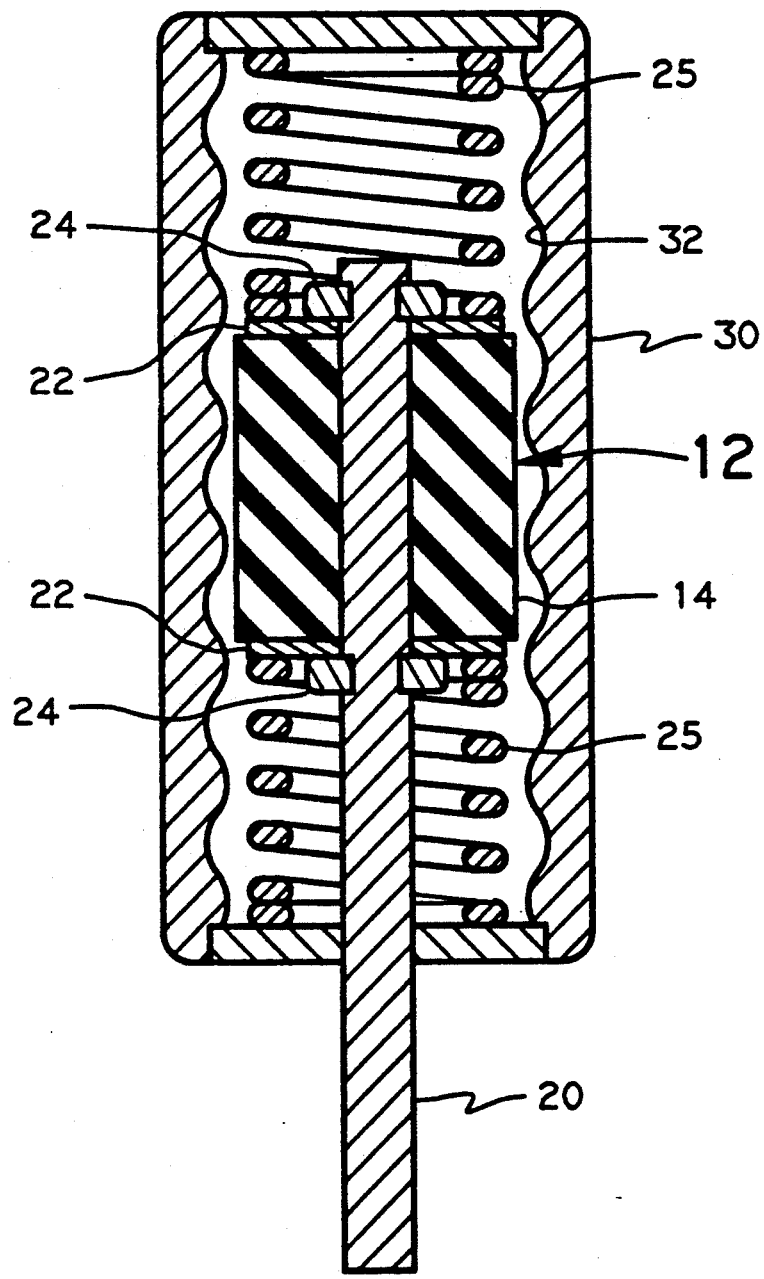
FIG. 4 is a cross-sectional schematic side view of a fourth embodiment of the present invention in an at rest position.
Figure 5:
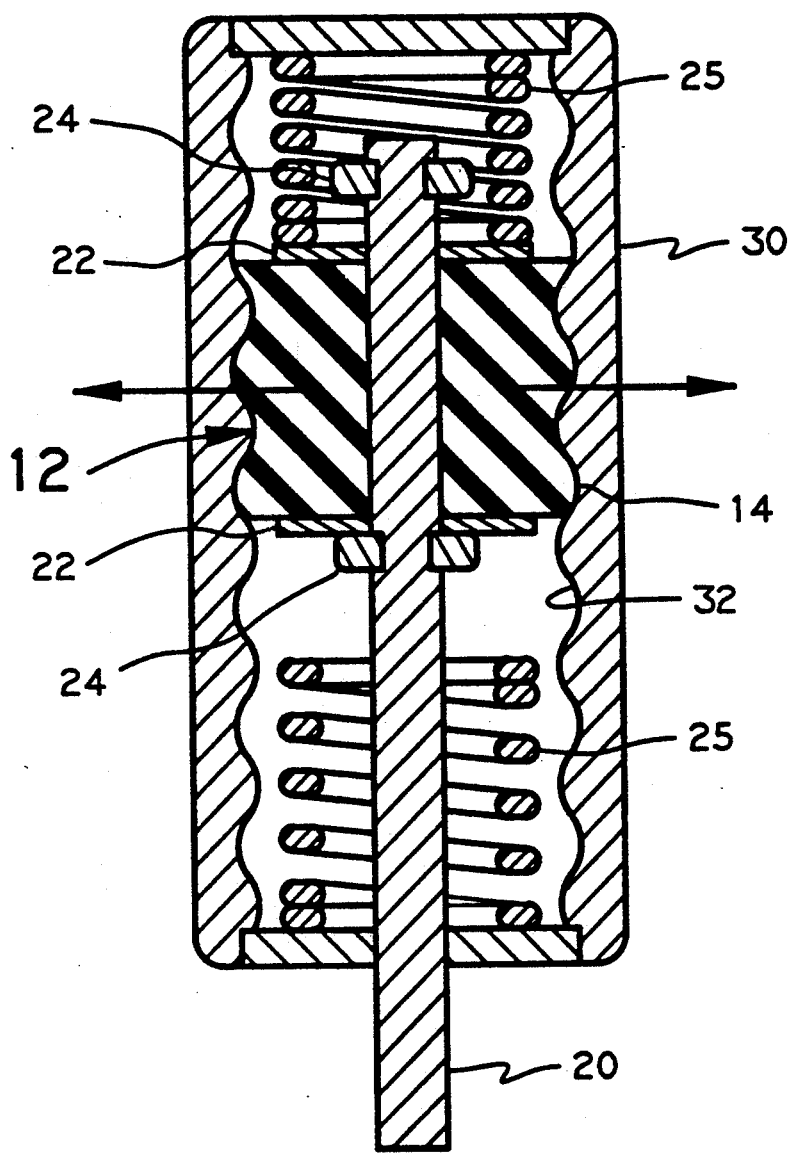
FIG. 5 is a cross-sectional schematic side view of the embodiment of FIG. 4 shown in a full damping mode.

A fourth embodiment is depicted in the at rest position in FIG. 4 and as positioned at one actuated position in FIG. 5. Piston 12 comprises a block of elastomer or elastomeric sleeve 14 secured on piston rod 20 by washers 22 and circlips 24. Two centering springs 25 engage opposing ends of piston 12. The amount of clearance between sleeve 14 and protrusions 32, along with the stiffness of spring 25, will determine the length of the decoupled stroke of piston rod 20. The more the clearance, the longer the decoupled length. Likewise, the softer the spring 25 the longer the decoupled length. When the stroke of piston rod 20 exceeds this predetermined amplitude, elastomeric sleeve 14 will bulge outwardly as shown by arrows (FIG. 5) and contact protrusions 32 formed on housing 30 and surface effect damping will be initiated. Additional stroke length will further compress and expand sleeve 14, thus providing more interference between the protrusions 32 and the sleeve 14, the rubbee and rubbing members, respectively and increasing the damping force in a non-linear manner.

Figure 6:
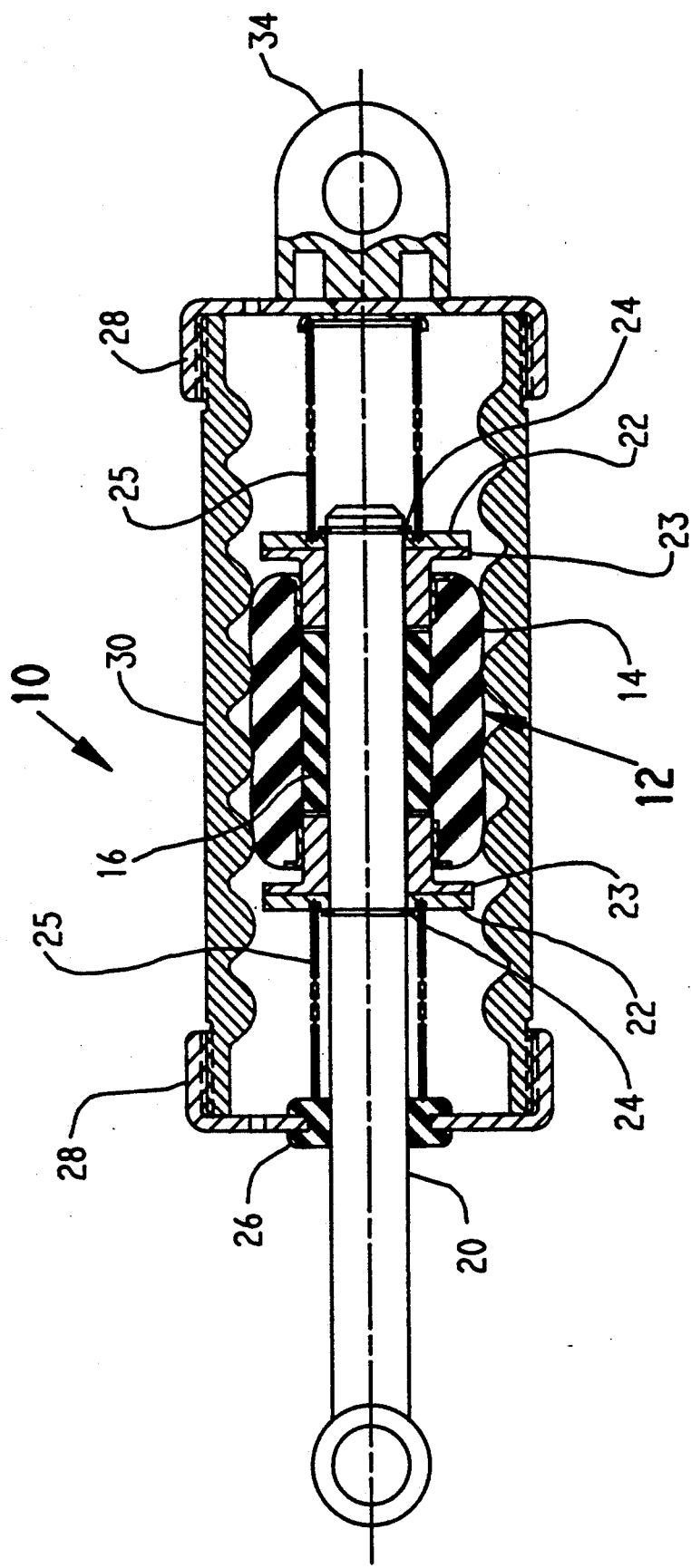
FIG. 6 is a side elevational view in partial section depicting a fifth embodiment of the present invention.

A fifth embodiment is shown in FIG. 6 generally at 10. Elastomeric bushing 16 fills a portion of the cavity formed between elastomeric sleeve 14 and piston rod 20. Compression bushings 23 engage opposite ends of elastomeric bushing 16 during portions of the stroke of piston 12. Washers 22 and circlips 24 are positioned outwardly of compression bushings 23 on piston rod 20 and their positions define the desired amount of decoupling present. First and second centering spring 25 engage the outer faces of washers 22 on the one hand and slide bearing 26 and end cap 28, respectively, on the other, and provide centering. In operation, as piston rod 20 extends (moves to the left in FIG. 6), the right compression bushing 23 will engage a first end of elastomeric bushing 16 causing it to bulge which, in turn, causes sleeve 14 to bulge and increases the level of surface effect damping. As piston 12 moves further to the left, the left centering spring 25 will cause compression bushing 23 to experience relative movement relative to piston rod 20 engaging the opposite end of elastomeric bushing 16 and resulting in an increase in the damping force. The resulting damping force versus stroke length curve will be non-linear, having a slope which increases when the first bushing is engaged and increases again once both compression bushings 23 are engaged.

Figure 7:
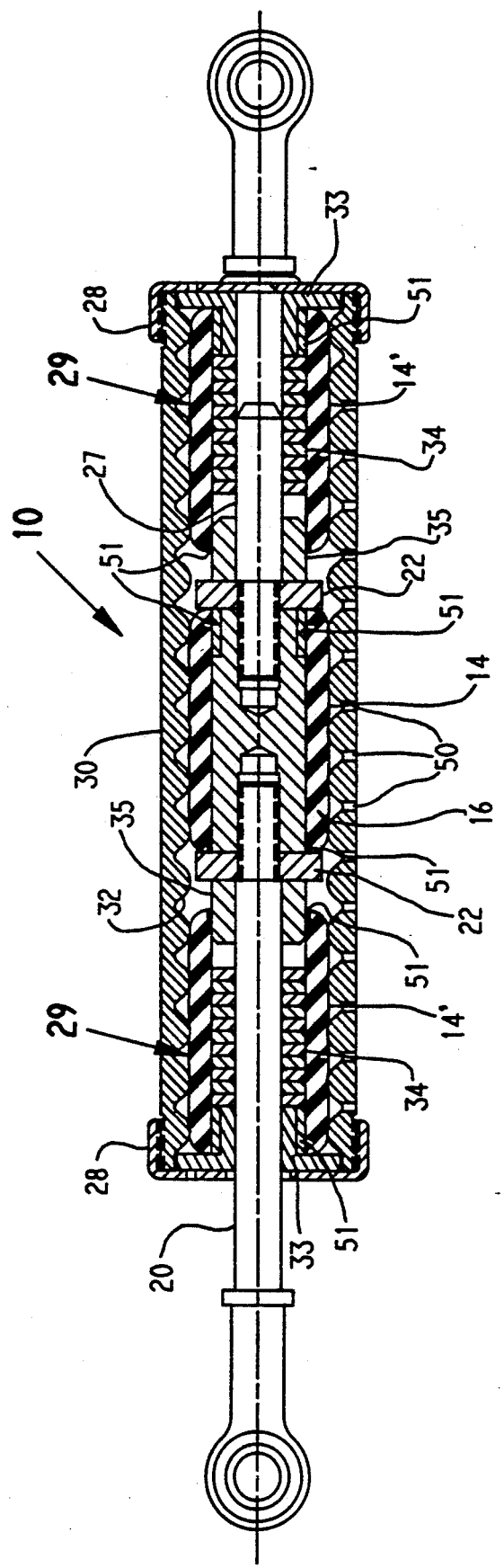
FIG. 7 is a side elevational view in partial section depicting a sixth embodiment of the present invention.

A sixth embodiment is depicted in FIG. 7 generally at 10. A first piston 12 is fixed to piston rod 20 by threading inner bushing 16 onto the piston rod 20. An elastomeric sleeve 14 surrounds the inner bushing 16 and may have a stepped fit therewith (not shown). A stub shaft 27 is threaded into an opposite side of inner bushing 16 to form an extension to piston rod 20. Inner bushing 16 may be formed of aluminum, for example. The centralized first piston 12 establishes a threshold or minimum level of damping as a result of its designed interference with protrusions 32 formed on housing 30. Two floating pistons 29 are shown on either side of piston 12. It will be appreciated that additional floating pistons 29 can be added to provide additional variation in damping levels and provide additional spring rate and stroke length for the damper 10. Metallic washers 22 form positive reaction surfaces for pistons 12 and 29 and are attached to piston rod 20 and stub shaft 27, such as by threading.

Floating pistons 29 each comprise a preferably highly damped elastomeric sleeve 14' having a stack of annular-shaped elastomeric washers 34 contained therein. Elastomeric sleeves 14' of floating pistons 29 can be constructed of the same elastomer as sleeve 14 or of progressively harder or softer elastomer, depending on the damping level and spring rates desired. Certainly, washers 34 could be replaced by an outwardly expanding elastomeric bushing as in earlier embodiments. Washers 34 are preferably highly lubricated either with an externally applied lubricant or an internally combined lubricating filler (e.g. Teflon ® particles). End plugs 33 which may be made of a filled reinforced nylon or Teflon ® material are pressed into the outermost ends of floating pistons 29. These allow the centering and spatial retention of the assembly. As shown, the left most plug 33 floats on piston rod 20. The opposite ends of floating pistons 29 are slidably fit over bushings 35 which are made of the same nylon material and are free to slide on the piston rod 20 and stub shaft 27, respectively.

In operation, left-hand floating piston 29 damps movement of piston rod 20 to the left and provides non-linear increasing spring rate. As piston rod 20 moves to the left, bushing 35 slides into elastomeric sleeve 14' of the left hand floating piston 29. The distance moved without contacting the first of the plurality of washers 34 comprises one half the length of the decoupled stroke of the piston assembly, the decoupled stroke being subjected only to the threshold damping produced by center piston 12. As movement of piston rod 20 continues to the left, the stack of washers 34 will be compressed and cause sleeve 14' to bulge outwardly which increases the surface effect damping force. Reinforcing rings 51 can be inserted in each end to minimize the bulging of the end and focus bulging to the center of the piston to minimize potential for splitting the ends of sleeve 14'. Holes 50 provide exhaust for entrapped air so the piston does not become a gas spring. The right hand floating piston 29 will similarly damp movement of piston 20 toward the right and provide non-linear damping and spring rate characteristics.

Figure 8:
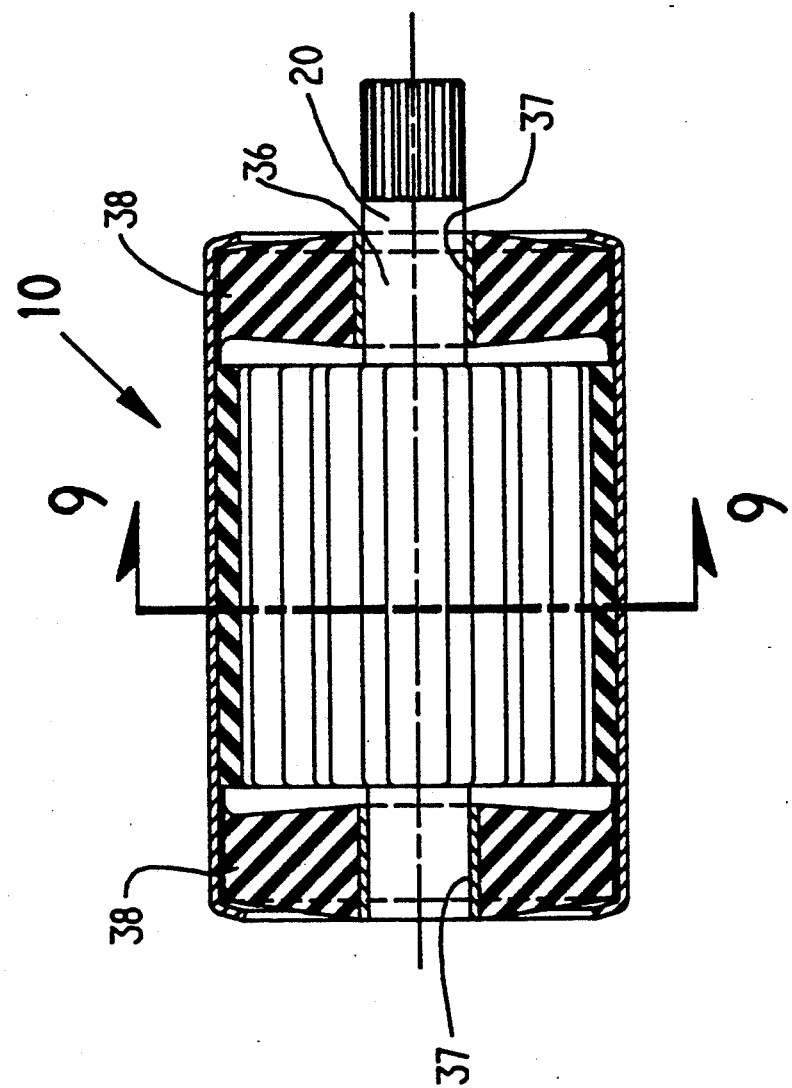
FIG. 8 is a cross-sectional side view depicting a seventh embodiment for use in rotary applications.
Figure 9:
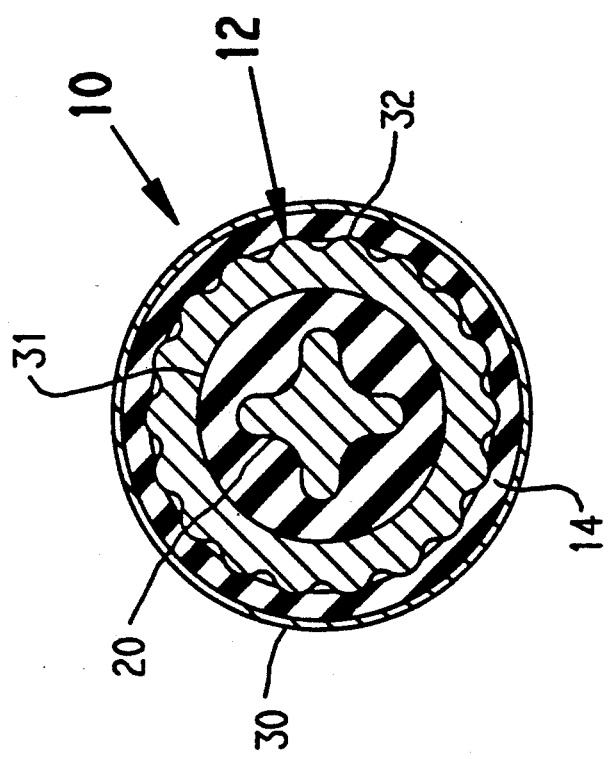
FIG. 9 is a cross-sectional end view taken along line 9—9 of FIG. 8 for use in rotary applications.

A seventh embodiment is shown in FIGS. 8 and 9 generally at 10. The damper 10 comprises a rotary damper having a piston 12 mounted upon piston rod 20. In this embodiment, protrusions 32 are formed on the metallic piston 12 (FIG. 9) and the elastomer sleeve 14 is preferably bonded within housing 30. The portion of piston rod 20 extending through the piston 12 is generally cross-shaped. A layer of elastomer 31 surrounds cross-shaped piston rod 20 and is preferably bonded to both rod 20 and piston 12. This elastomeric layer 31 provides the decoupling feature for this rotary embodiment. Relief gaps (not shown) in the elastomer 31 can be provided to further soften its response and permit a larger decoupled region in rotation. One end of rod 20 protrudes from housing 30 for connection to an element (not shown) in need of damping. The other end of rod 20 and an intermediate region 36 are received in bearings 37 formed in elastomeric end caps 38. These end caps 38 will permit some skewing of the axis of the piston rod 20 and some relative axial motion and damper 10 will generate a force to damp the rotational forces, the forces tending to skew the piston and those forces generating axial motions. These elastomeric end caps 38 also provide a centering feature in the axial and cocking directions, and provide support for a center of rotation.

Figure 10:
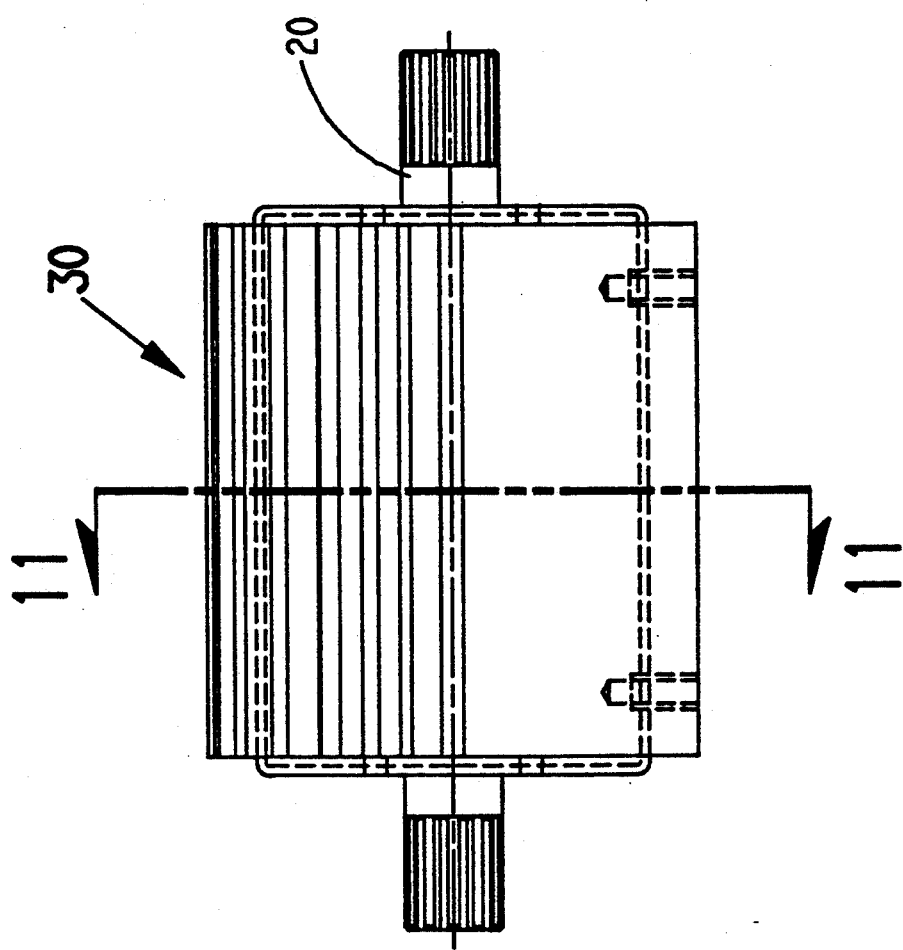
FIG. 10 is a cross-sectional side view of an eighth embodiment also for rotary applications.
Figure 11:
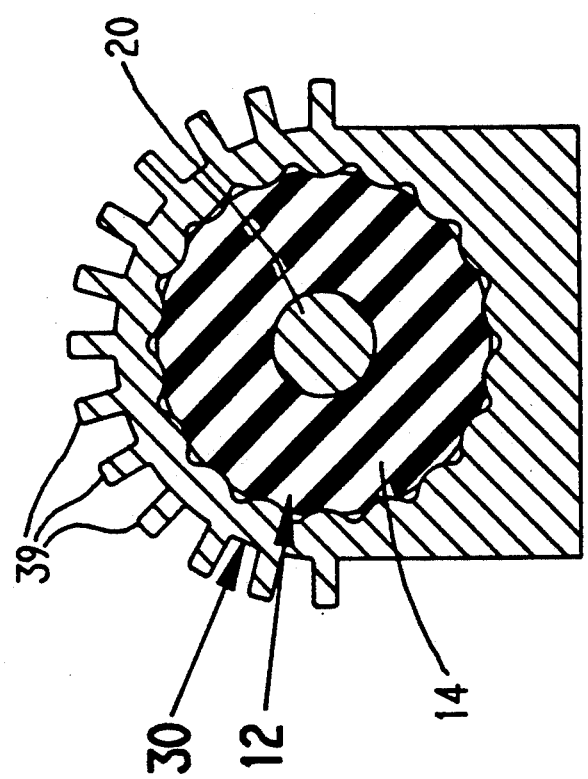
FIG. 11 is a cross-sectional end view taken along line 11—11 of FIG. 10.

FIGS. 10 and 11 set forth an eighth embodiment generally at 10. In this second rotary embodiment, piston 12 (FIG. 11) is equipped with the elastomeric sleeve 14 and the protrusions 32 are formed on housing 30. Housing 30 is shown here being equipped with longitudinally extending ribs 39 to dissipate heat and can be made of aluminum or other good conducting material. Buildup of heat in damper 10 could result in breakdown of the material in elastomeric sleeve 14. It will be apparent that the heat-dissipating ribs 39 could extend circumferentially, rather than axially as well, or be of alternate design. Also in this embodiment, piston rod 20 extends laterally from both ends of housing 30 (FIG. 10) to permit coupling to two elements. A rotary damper 10 of the type disclosed herein can be utilized to damp vertical engine motion (e.g., as an engine torque restraint strut) or as a helicopter strut damper, by attaching two crank arms on the splines formed on shaft 20.

Figure 12:
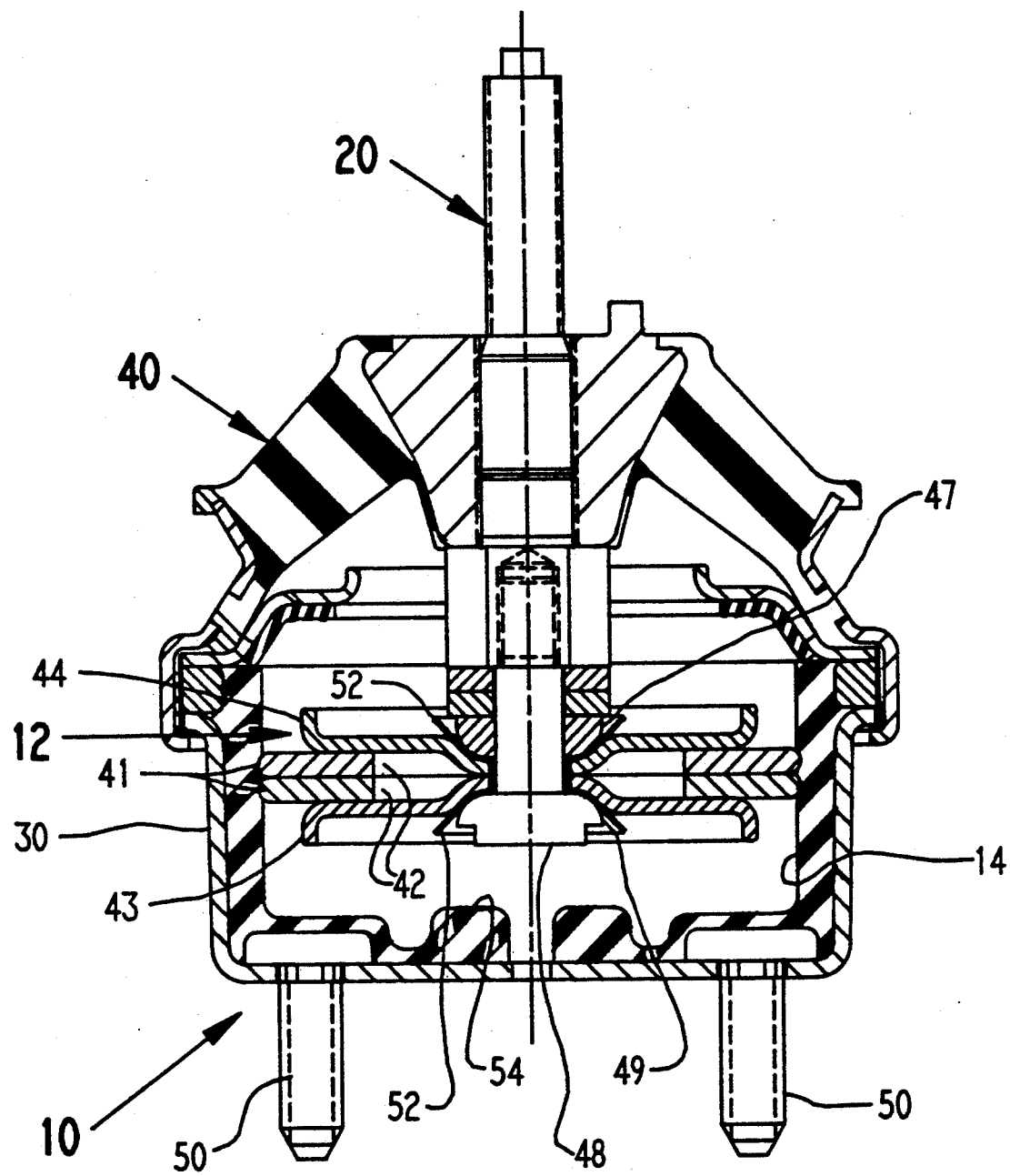
FIG. 12 is a cross-sectional side view of a ninth embodiment of the present invention having multi-directional damping capability.
Figure 12A:
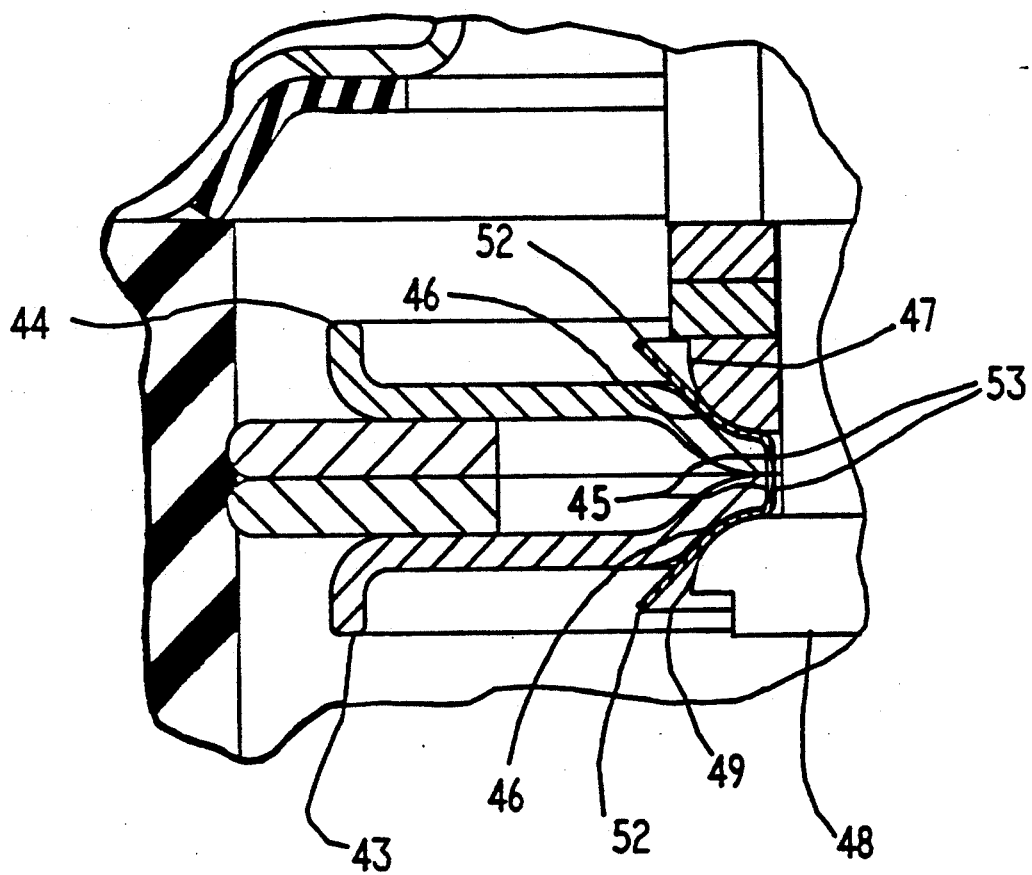
FIG. 12a is an enlarged cross-sectional side view of a portion of the ninth embodiment of the present invention, illustrating the angular misalignment feature.

A ninth embodiment is illustrated in FIGS. 12 and 12a generally at 10. The surface effect damper 10 takes the form of a motor mount in which piston rod 20 is secured to housing 30 by a generally frustoconically shaped block of elastomer 40. Projection portion of piston rod 20 may be secured to one of the engine or the vehicle frame (not shown). One or more protruding studs 50 are used to secure the housing 30 to the other of the two. Elastomeric sleeve 14 is bonded internally to housing 30. Piston 12 is made up of a series or stack of plates or disks 41, although only one is required. The number of disks 41 and thickness of those disks and degree of interaction can be varied to determine the level of the damping force for damper 10. Each disk 41 has a central aperture 42 formed therethrough which has an inner diameter greater in diameter than the outside diameter of a portion of piston rod 20 which passes therethrough. Disks 41 are clamped between first and second rigid plates 43 and 44 such that they are free to slide in the generally radial direction. The disks 41 can be lubricated to provide the desired level of radial surface effect damping.

As best seen in FIG. 12a, each rigid plate (43,44) has a central opening 45 which is surrounded by, or has formed about it, a generally spherical shaped recess 46. A downwardly facing generally spherical bearing surface 47 is formed on the bottom portion of the piston rod 20 and opposes a like upper generally spherical shaped surface 49 on shoulder bolt 48. The spherical recesses 46 formed on rigid plates 43 and likewise the spherical surface on rigid plate 44 match the form of surfaces 47 and 49. Shoulder bolt 48 forms an extension of piston rod 20 by being threaded into one end thereof. A pair of standoff washers 52 are positioned between the spherical bearing surfaces 47 and 49 and the spherical recesses 46 on plates 43 and 44. This combined assembly creates a ball joint effect which allows six degrees of freedom. Washers 52 are preferably made of filled reinforced nylon or Teflon ® and have projecting shoulders 53 which contact each other through the central openings 45. The comparative lengths of shoulders 53 as compared to the offsets of spherical recesses 46 determine the amount of axial decoupling in this embodiment. In addition, the spacing between central openings 45 and washers 52 afford radial decoupling in the horizontal plane as well. Also, the spherical recesses 46 in conjunction with the washers 52 and the plates 43 and 44, permit tilting of the piston 12 relative to the axis of piston rod 20. In this way, the decoupling can be controlled for radial and axial directions and the tilting accommodated in the tolerances of two precisely shaped spherical elements: the standoff washers 52 and rigid plates (43,44).

As designed, the mount is fully safetied; that is, should elastomer 40 fail, piston 12 is surrounded by metallic housing 30. In the event of an extreme extension of piston rod 20, rigid plate 44 will snub against the top of housing 30. The unique feature of this pivotal arrangement is the ability of the plates 43 and 44 to rotate or misalign relative to piston rod 20 under snubbing loads. Prior art snubbers were rigidly attached to the piston rod 20. This improves over the prior art by allowing less beefy snubber components. This snubber arrangement can be suited for other types of engine mounts, such as fluid engine mounts. In the case of the fluid mount, the plates 43 and 44 and disks 41 would be replaced by one unitary snubber element. In the event of extreme movement downward of piston 12, head of shoulder bolt 48 will snub upon an elastomeric pillow 54 formed on the bottom inner surface of housing 30. Radially, elastomeric sleeve 14 will snub against rigid plates 43 and 44 following radial motion. Further under severe down loads, partial compression of pillow 54 by the head of bolt 48 will be followed by plate 43 contacting the bottom of housing 30 or any skin of elastomer bonded thereto.

Various changes, alternatives and modifications will become apparent to one of ordinary skill in the art following a reading of the foregoing description. It is intended that all such changes, alternatives and modifications as come within the scope of the appended claims be considered part of the present invention.

What is claimed is:

1. A surface effect device capable of producing a surface effect damping force having both a hysteresis and a frictional component, comprising:
   a) a generally cylindrical housing;
   b) a generally cylindrical piston mounted upon a piston rod and adapted to move with respect to said housing;
   c) a rubbing member associated with and mounted for movement with a first one of said housing and said piston said rubbing member including an elastomeric portion on one surface;
   d) a rubbee member associated with and mounted for movement with another one of said housing and said piston said rubbee member having a plurality of protrusions for engaging the elastomeric portion of said rubbing member to produce hysteresis damping as a result of relative movement between said rubbing member and said rubbee member;
   e) means for moving at least a first portion of said piston relative to said housing a sufficient distance to generate a surface effect damping force as said first portion of said piston moves in at least one direction;
   f) means for increasing said surface effect force in a non-linear manner over at least a portion of the stroke of said piston;

g) means for decoupling at least a portion of said piston from said piston rod over at least a segment of said stroke so as to exert a non-surface effect damping force upon said piston for at least said segment;

whereby said surface effect force is of significantly greater magnitude than said non-surface effect damping force.

2. The surface effect device of claim 1 wherein said means for decoupling said piston acts in each of two opposed directions.

3. The surface effect device of claim 2 wherein said means for decoupling comprises centering spring means engaging portions of opposite ends of said piston.

4. The surface effect device of claim 1 wherein said surface effect damping force is amplified in one of two axial directions while said means for decoupling exerts a minimal damping force in each of said two axial directions.

5. The surface effect device of claim 1 wherein said decoupling means comprises a lost-motion connection between said piston and said piston rod by which said piston remains stationary for low amplitude piston rod movement and moves conjointly with large amplitude piston rod movement.

6. The surface effect device of claim 5 further comprising means to cause radial expansion of one of said rubbing and rubbee member mounted for movement with said piston to thereby increase said surface effect damping force.

7. The surface effect device of claim 6 wherein said lost-motion connection directly causes radial expansion of one of said rubbing and rubbee member mounted for movement with said piston to increase contact with one of said rubbee and rubbing member mounted for movement with said housing.

8. The surface effect device of claim 1 wherein a ratio of hysteresis damping to friction damping is in the range between 0.25 and 4.0.

9. The surface effect device of claim 1 wherein one of said rubbing and rubbee member mounted for movement with said piston comprises a stack of annular elastomeric elements, portions of which are confined between parallel surfaces.

10. The surface effect device of claim 9 wherein said parallel surfaces are defined by substantially rigid plate members which have concentric bores extending axially therethrough, said axial bores having generally spherical recesses formed thereabout, said spherical recesses receiving spherically shaped pivot means permitting angular misalignment of said piston with respect to said piston rod.

11. The surface effect device of claim 10 wherein one of said spherical pivot means comprises a head of a shoulder bolt, said shoulder bolt head snubbing against an elastomer protrusion formed on a bottom inner surface of said housing.

12. The surface effect device of claim 9 wherein said means for non-linearly increasing said damping force comprises a snubber positioned at one end of said housing which is contacted by a head of a shoulder bolt.

13. The surface effect device of claim 9 wherein said stack of annular elastomeric elements are confined between a floating piston and a piston rod.

14. The surface effect device of claim 13 wherein said floating piston comprises least two floating pistons positioned on either side of a central piston, said central piston exerting a first initial level of surface effect damping.

15. The surface effect device of claim 1 wherein said piston is mounted for rotational movement within said housing.

16. The surface effect device of claim 15 wherein said housing is equipped with heat dissipating elements.

17. The surface effect device of claim 1 wherein said rubbing member is formed on exterior portion of said piston and said rubbee member is formed on an interior portion of said housing.

18. The surface effect device of claim 17 wherein said rubbing member comprises an elastomeric sleeve encircling at least a portion of said piston.

19. The surface effect device of claim 18 wherein said means for increasing said surface effect force in a non-linear manner comprises means to radially expand said elastomeric sleeve into tighter contact with said rubbee member.

20. The surface effect device of claim 19 wherein said means for increasing said surface effect damping force in said non-linear manner comprises an elastomeric material contained within at least a portion of said piston.

21. The surface effect device of claim 20 wherein said means for increasing said surface effect damping force in said non-linear manner further comprises at least one compression bushing for engaging an end of said elastomeric material.

22. The surface effect device of claim 21 wherein said compression bushing exerts a variable force on said elastomeric material resulting in variability of said surface effect damping force.

23. The surface effect device of claim 22 wherein the elastomeric material comprises an elastomeric bushing extending through at least a portion of a central section of said piston, each end of said elastomeric bushing being alternately or simultaneously engaged by an end of a first and second compression bushing, respectively.

24. The surface effect device of claim 20 wherein said elastomeric material comprises a flowable material within at least a portion of a central section of said piston.

25. An engine mount capable of producing a surface effect damping force having both a frictional and a hysteresis component, said mount comprising:

a) a housing, at least a portion of said housing having a layer of elastomer bonded thereto, said housing adapted for attachment to one of a frame and an engine;

b) a piston assembly, said piston assembly having a portion bonded to said housing by means of a frustoconical elastomeric block, said piston assembly including i) a piston rod having a first end portion adapted for attachment to another of the frame and the engine;

ii) said piston rod having a second end portion for mounting a plurality of annular disk members, said second end portion including a first inwardly directed partially spherical surface;

iii) a piston including (a) a first rigid plate member, said rigid plate member having a central aperture for receiving a portion of said piston rod, a first generally spherical recess surrounding said aperture for engaging said first inwardly directed spherical end portion;

(b) an intermediate portion having a second inwardly directed, partially spherical surface;

(c) a second rigid plate member having a central aperture for receiving a portion of said piston, a second generally spherical recess surrounding said aperture for engaging said second inwardly directed spherical surface;

(d) at least one annular disk received between said first and second rigid plate members, each said disk having an inner diameter which is substantially greater than a corresponding outer diameter of said piston rod;

whereby said plurality of annular disks in said piston can tilt relative to a longitudinal axis of said piston rod.

26. The engine mount of claim 25 wherein said piston further comprises a pair of low-friction standoff washers extending through the central apertures in said rigid plate members, said standoff washers defining a length of stroke in which said piston is decoupled from said piston rod.

27. A uni-directional surface effect device capable of producing a surface effect damping force having both a hysteresis and a frictional component, comprising:

a) a generally cylindrical housing;

b) a generally cylindrical piston mounted upon a piston rod and adapted to move with respect to said housing;

c) a rubbing member associated with and mounted for movement with a first one of said housing and said piston said rubbing member including an elastomeric portion on one surface;

d) a rubbee member associated with and mounted for movement with another one of said housing and said piston said rubbee member having a plurality of protrusions for engaging the elastomeric portion of said rubbing member to produce hysteresis damping as a result of relative movement between said rubbing member and said rubbee member;

e) means for moving at least a first portion of said piston relative to said housing a sufficient distance to generate a surface effect damping force as said first portion of said piston moves in at least a first direction;

f) means for increasing said surface effect force in a non-linear manner over at least a portion of the stroke of said piston in said first direction;

g) means for exerting a second lesser damping force upon said piston in a second opposite direction;

whereby said surface effect damping force operating in said first direction is of significantly greater magnitude than said lesser damping force operating in said opposite direction.

28. An engine mount capable of producing a damping force, said mount comprising:

a) a housing, said housing adapted for attachment to one of a frame and an engine;

b) a piston assembly, said piston assembly having a portion bonded to said housing by means of a frustoconical elastomeric block, said piston assembly including;

i) a piston rod having a first end portion adapted for attachment to another of the frame and the engine and a longitudinal axis;

ii) said piston rod having a second end portion with a downwardly facing spherical section formed thereon;

iii) a piston rod extension having a upwardly facing spherical section formed thereon, said piston rod extension connected to said second end portion of said piston rod;

c) a snubber assembly including a snubber member, said snubber member having a central aperture for receiving a portion of said piston rod, a first upwardly facing spherical recess surrounding said aperture for engaging said first downwardly facing spherical portion formed on said piston rod; a second downwardly facing generally spherical recess surrounding said aperture for engaging a second upwardly facing spherical surface formed on said piston rod extension;

whereby said snubber member can tilt relative to the longitudinal axis of said piston rod.

* * * * *

UNITED STATES PATENT AND TRADEMARK OFFICE
CERTIFICATE OF CORRECTION

PATENT NO. : 5,257,680

DATED : November 2, 1993

INVENTOR(S) : Corcoran, et al., Erie, PA

It is certified that error appears in the above-identified patent and that said Letters Patent is hereby corrected as shown below:

Col. 1, line 30, replace "Haydecki" with --Gaydecki--.

Col. 3, line 45, after "Sleeve 14," insert --a cushioned configuration which is--.

Col. 7, line 31, replace "projection" with --projecting--.

Claim 14, line 67, after "comprises", insert --at--.

Signed and Sealed this

Second Day of August, 1994

BRUCE LEHMAN

*Attest:*

*Attesting Officer*    Commissioner of Patents and Trademarks